US008797315B1

(12) United States Patent
Kuhne (10) Patent No.: US 8,797,315 B1
(45) Date of Patent: Aug. 5, 2014

(54) SEGMENTED EDITOR FOR TOURS OF A GEOGRAPHIC INFORMATION SYSTEM, AND APPLICATIONS THEREOF

(75) Inventor: Stefan Kuhne, San Jose, CA (US)

(73) Assignee: Google Inc., Mountain View, CA (US)

( * ) Notice: Subject to any disclaimer, the term of this patent is extended or adjusted under 35 U.S.C. 154(b) by 549 days.

(21) Appl. No.: 12/893,216

(22) Filed: Sep. 29, 2010

(51) Int. Cl.
*G06T 15/00* (2011.01)
*G06F 3/01* (2006.01)
*G06F 3/048* (2013.01)

(52) U.S. Cl.
CPC . *G06F 3/01* (2013.01); *G06F 3/048* (2013.01)
USPC ............ 345/419; 345/423; 345/629; 715/230

(58) Field of Classification Search
CPC .................................. G06F 3/01; G06F 3/048
USPC ............................ 345/419, 423, 629; 715/230
See application file for complete search history.

(56) References Cited

U.S. PATENT DOCUMENTS

| 7,823,058 | B2 * | 10/2010 | Pea et al. ....................... | 715/230 |
| 7,843,451 | B2 * | 11/2010 | Lafon ........................... | 345/423 |
| 7,990,394 | B2 * | 8/2011 | Vincent et al. ................ | 345/629 |
| 8,072,448 | B2 * | 12/2011 | Zhu et al. ..................... | 345/419 |
| 8,350,849 | B1 * | 1/2013 | Jones et al. ................... | 345/419 |

OTHER PUBLICATIONS

Chen, "QuickTime VR—An Image-Based Approach to Virtual Environment Navigation," ACM, 1995, pp. 29-38.

Endo et al., "Image-Based Walk-Through System for Large-Scale Scenes," in 4th International Conference on Virtual Systems and MultiMedia, 1998, 6 pages.
Hirose, "Image-Based Virtual World Generation," IEEE, Jan.-Mar. 1997, pp. 27-33.
Kato et al., "Town digitzing: Recording of street views by using omnidirectional vision sensors," IEEE, 2000, pp. 2571-2576.
Kimber et al., "FlyAbout: Spatially Indexed Panoramic Video," Multimedia '01 Proceedings of the Ninth ACM International Conference on Multimedia, 2001, 9 pages.
Lippman, "Movie-Maps: An Application of the Optical Videodisc to Computer Graphics," ACM, 1980, pp. 32-42.
Naimark, "A 3D Moviemap and a 3D Panorama," Society of Photo-Optical Instrumentation Engineers, SPIE Proceedings, vol. 3012, San Jose, 1997, 11 pages.

(Continued)

*Primary Examiner* — Phu K Nguyen
(74) *Attorney, Agent, or Firm* — Dority & Manning, P.A.

(57) ABSTRACT

Embodiments relate to editing a tour in a geographic information system. In an embodiment, a computer-implemented method efficiently edits a tour through a three-dimensional environment on a geographic information system. In the method, a user is enabled to define a tour comprising a series of segments. Each segment specifies a duration of the segment in the tour, a position of a virtual camera in the three-dimensional environment during playback of the segment of the tour, and an asset to be visible at a specified position in the three-dimensional environment at a time relative to when the segment of the tour is played. A user is also enabled to alter an order of the series of segments. In response to an input to play the tour, for each segment of the tour in an order specified by the series of segments, the virtual camera is moved to the position specified by the segment to display the three-dimensional environment from a viewpoint of the virtual camera. The asset is displayed in the three-dimensional environment.

20 Claims, 5 Drawing Sheets

(56) References Cited

OTHER PUBLICATIONS

Taylor, "VideoPlus: A Method for Capturing the Structure and Appearance of Immersive Environments," IEEE Transactions on Visualization and Computer Graphics, vol. 8, Issue 2, Apr.-Jun. 2002, pp. 171-182.

Uyttendaele et al., "Image-Based Interactive Exploration of Real-World Environments," IEEE Computer Graphics and Applications, May/Jun. 2004, pp. 52-63.

* cited by examiner

FIG. 4B

SEGMENTED EDITOR FOR TOURS OF A GEOGRAPHIC INFORMATION SYSTEM, AND APPLICATIONS THEREOF

BACKGROUND

1. Field of the Invention

The present field relates to navigating in a geographic information system.

2. Related Art

A geographic information system (GIS) is a system for archiving, retrieving, displaying or manipulating data indexed according to the data elements' geographic coordinates. The data element may be a variety of data types such as, for example, imagery, maps, models of buildings and terrain and other geographic features.

A geographic information system may display a three-dimensional environment to a user from a perspective of a virtual camera. The perspective of a virtual camera may be defined by a position and orientation. By changing the position and orientation of the virtual camera, the user can sightsee within the three-dimensional environment. For example, the user may "visit" the Eiffel Tower in the GIS by directing a perspective of a virtual camera toward a representation of the Eiffel Tower.

A perspective of a virtual camera may be stored in a language such as Keyhole Markup Language (KML). Interpreting the KML, a GIS may move the virtual camera to a stored perspective to display a sight. Using the stored perspective, a user can return to the sight. Further, KML can store a sequence of perspectives. Interpreting the KML, the GIS may move the virtual camera iteratively from one perspective to the next. This enables the user to tour a series of sights, e.g., the Eiffel Tower, Big Ben, etc. However, editing the KML defining a tour can be cumbersome for the user.

BRIEF SUMMARY

Embodiments relate to editing a tour in a geographic information system. In a first embodiment, a computer-implemented method efficiently edits a tour through a three-dimensional environment on a geographic information system. In the method, a user is enabled to define a tour comprising a series of segments. Each segment specifies a duration of the segment in the tour, a position of a virtual camera in the three-dimensional environment during playback of the segment of the tour, and an asset to be visible at a specified position in the three-dimensional environment at a time relative to when the segment of the tour is played. A user is also enabled to alter an order of the series of segments. In response to an input to play the tour, for each segment of the tour in an order specified by the series of segments, the virtual camera is moved to the position specified by the segment to display the three-dimensional environment from a viewpoint of the virtual camera. The asset is displayed in the three-dimensional environment.

In a second embodiment, a system efficiently editing a tour through a three-dimensional environment on a geographic information system. The system includes a series of segments. Each segment specifies a duration of the segment in the tour, a position of a virtual camera in the three-dimensional environment during playback of the segment of the tour, and an asset to be visible at a specified position in the three-dimensional environment at a time relative to when the segment of the tour is played. The system also includes a tour editor module that enables a user to define a tour comprising the series of segment and enables a user to alter an order of the series of segments. In response to an input to play the tour, a tour interpreter module, for each segment of the tour in an order specified by the series of segments, changes a position of the virtual camera to the position specified by the segment to display the three-dimensional environment from a viewpoint of the virtual camera. Finally, a renderer module that, for each segment of the tour in an order specified by the series of segments, displays the asset in the three-dimensional environment in response to the input to play the tour.

In a third embodiment, a computer-implemented method efficiently edits a tour through a three-dimensional environment on a geographic information system. In the method, a first input is received from a user to define a segment of the tour. The segment specifies a time in the tour, a position of a virtual camera in the three-dimensional environment at the time in the tour, and an asset to be displayed at a specified position in the three-dimensional environment at the time in the tour. A second input from a user is received to alter the time specified by the segment. In response to the second input, when the virtual camera is at the position as specified in the segment and when the asset is displayed as specified in the segment during playback of the tour are altered.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Methods and systems are needed to more easily edit a tour of a three-dimensional environment.

Embodiments described here relate to editing a tour in a geographic information system. In embodiments, the tour is specified by a series of segments. Each segment has a tour time in the tour timeline. Further, each segment defines where to position the virtual camera at that time during the tour and any assets, such as visual placemarks and overlays, to display at that time during the tour. To edit the tour, the user can change a tour time in which a segment is played. When the tour time of the segment is updated, both the time when the segment's assets are displayed and the virtual camera is moved to the specified position in the three-dimensional environment are also updated. In this way, embodiments enable a user to easily edit a tour of a geographic information system. This and other embodiments are discussed below with reference to the accompanying drawings.

Figure 1A:
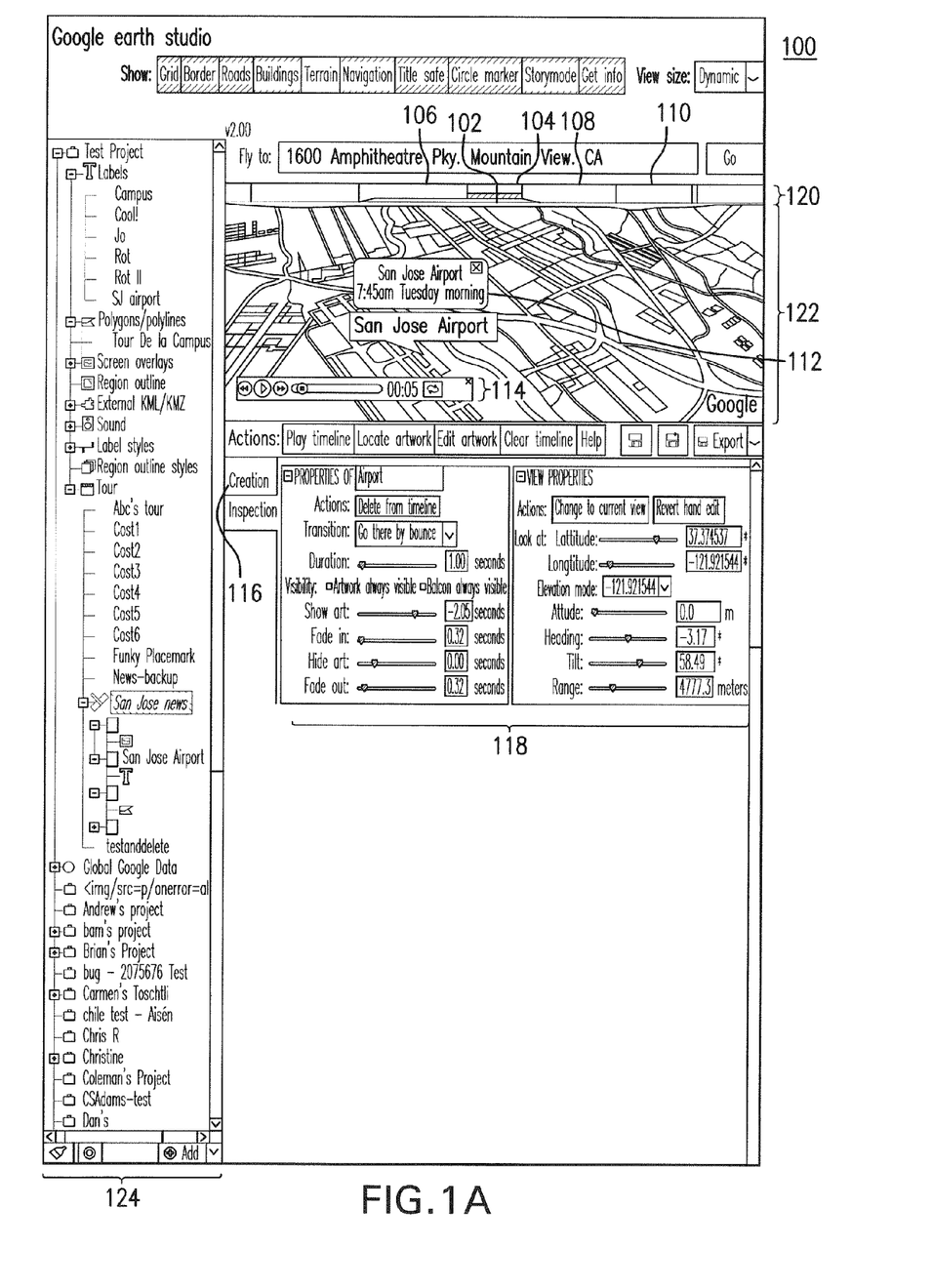
FIG. 1A is a diagram illustrating a user interface to edit segments of a tour, according to an embodiment.

FIG. 1A is a diagram illustrating a user interface 100 of a tour editor, according to an embodiment. User interface 100 includes various user interface components—a viewport 122, a control panel 114, a cursor 102, a segment panel 120, an element tree panel 124, a timeline input tab 116 and a segment panel 120. Each of these components are described in turn.

Viewport 122 shows the three-dimensional environment from a perspective of a virtual camera at a particular time in a tour. More specifically, viewport 122 shows the three-dimensional environment from a perspective of a virtual camera at a time in the tour selected by a user from control panel 114 and identified by cursor 102.

Control panel 114 includes controls that enable a user to select a time in the tour to edit. For example, control panel 114 enables a user to change a tour time selected in the editor. To change the tour time, control panel 114 may include a variety of different inputs. For example, control panel 114 may include buttons that enable the user to play, fast forward or rewind in the tour. Control panel 114 may further include a slider that enables a user to select a specific point in the tour timeline as the tour time. Changing the tour time may cause the virtual camera to move to a different location in the tour and, accordingly, a different perspective may be displayed in viewport 122. Further, changing the tour time may move cursor 102 to a different position in segment panel 120 and may cause different segment data to be displayed in segment input panel 118. In this way, by changing the tour time selected in the editor, control panel 114 enables a user to select which portion of the tour to edit. While control panel 114 is displayed in viewport 122, in an embodiment a user may move control panel 114 to a different portion of user interface 100 so as not to obstruct viewport 122.

Cursor 102 identifies which tour time is selected in the tour editor. Cursor 102 is positioned on segment panel 120 at a position corresponding to the selected time. Segment panel 120 includes segment icons, such as segment icons 104, 106, 108, and 110, representing segments of a tour. In segment panel 120, each segment icon has a length in proportion to the duration of the segment in the tour. In this way, cursor 120 identifies which segment in the tour corresponds to the time selected by the user using control panel 114. Data corresponding to the segment identified by cursor 102 is displayed in segment input panel 118.

Segment input panel 118 enables a user to edit a segment identified by cursor 102. In the example shown in user interface 100, cursor 102 overlays segment icon 102. Therefore, segment input panel 118 may enable a user to edit the segment associated with segment icon 102. A user may edit camera properties associated with the segment such as position (e.g., latitude, longitude, and altitude), an orientation (e.g., tilt and heading) and a range of a view frustum associated with the virtual camera. A user may also edit asset properties associated with the segment. As shown in viewport 122, the segment associated with segment icon 102 has an asset 112.

An asset may be displayable data element in the geographic information system.

In an example, an asset may be geocoded to a location in a three dimensional environment of the geographic information system. In further examples, an asset may be two-dimensional overlay to be texture mapped on a three-dimensional model in the three dimensional environment, a three-dimensional model, or a point of interest. An asset may have an associated informational balloon that provides information about the asset. Further, when a cursor hovers over an asset, additional information may be displayed in an informational balloon.

In user interface 100, the segment associated with segment icon 104 shows an asset 112 identifying "San Jose Airport" as a point of interest. Segment input panel 118 enables a user to modify data about asset 112 such as when in the segment to show asset 112 and how quickly to fade asset 112 in and out. In this way, segment input panel 118 enables a user to change whether and when asset 112 is visible. A visual indication of when an asset is visible may be displayed in segment input panel 118.

Segment input panel 118 also enables a user to specify other data associated with the segment. For example, the segment input panel 118 may enable a user to specify the duration of the segment a method of transitioning to the position associated with the segment. In this way, segment input panel 118 associates an asset, a camera position, and a duration with a particular segment.

As mentioned above, segment panel 120 includes segment icons, such as segment icons 104, 106, 108, and 110. Each segment icon has an associated segment with at least a specified duration and camera position and perhaps a specified asset and transition method. In an embodiment, a user may select a segment icon and reposition the segment icon in segment panel 120. By repositioning the segment icon, the time in which the associate segment is played is changed. Because the tour time when the segment is played is changed, the tour time when the camera is positioned at the location corresponding to the segment is changed and the tour time when the asset is displayed is also changed. In this way, segment panel 120 enables a user to modify easily a tour.

In addition to segment panel 120, a user may also position a segment using element tree panel 124. Element tree panel 124 may include a list of the tour segments. A user may drag an element from the list of tour segments to a position on segment panel 120 to add a segment to the project. Further, the position on segment panel 120 may designate where in the tour to add the new segment.

User interface 100 also includes a timeline input tab 116 that enables a user to add additional segments to a tour. As mentioned above, each additional segment has an associated camera position and duration and may also have an asset.

Figure 1B:
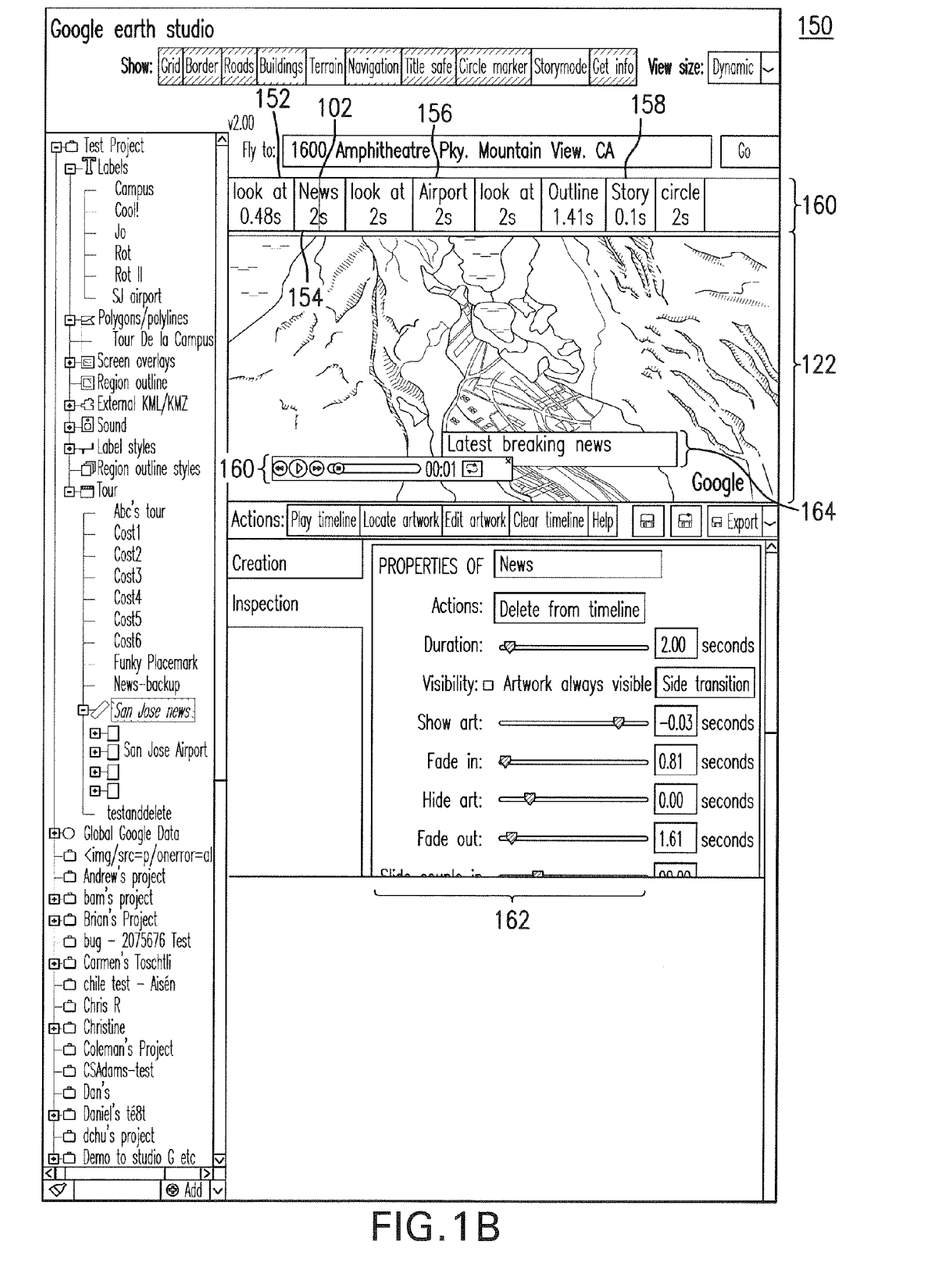
FIG. 1B is a diagram illustrating a user interface to edit segments of a tour in which the segment icons are approximately equal in length.

FIG. 1B is a diagram illustrating a user interface 150 to edit segments of a tour in which the segment icons are approximately equal in length. User interface 150 has some elements similar to user interface 100 in FIG. 1A. For example, user interface 150 includes control panel 114 that controls what is displayed in viewport 122 and where to position cursor 102. However, user interface 150 includes a segment panel 160 that differs from segment panel 120 in user interface 100. In particular, segment panel 160 shows segment icons, such as segment icons 152, 154, 156, and 158, having approximately equal length, whereas the length of each segment icon in segment panel 120 is proportional to the duration of the associated tour segment.

Because the segment icons do not indicate their duration with their length, they each display their respective durations in the icons. For example, the segment icon 152 shows a duration of two seconds. Having approximately equally spaced segment icons may be advantageous when some of the segments have brief duration. For example, the segment corresponding to segment icon 158 lasts only 0.1 seconds. Given this brevity, if segment icon 158 had a length in proportion to the duration, then it would be so slim that it may be difficult to see or select. For that reason, giving the segment icons approximately equal length may be advantageous. The word "approximately" is meant to indicate that the segment icons may not have precisely the same number of pixels in length. However, their length may be similar enough to appear equal to a user.

Because the segment icons in segment panel 160 have equal length, but unequal duration, cursor 102 may move across different segment icons at different rates as the tour is being played. In user interface 150, cursor 102 overlays segment icon 154 and, therefore, data for the segment corresponding to segment icon 154 is displayed in a segment input panel 162.

Segment input panel 162 includes asset data for an asset 164 associated with the segment corresponding to segment icon 154. Similar to segment panel 118 in user interface 100, segment input panel 162 enables a user to modify data parameters for asset 164. While similar, segment input panel 162 differs in appearance from segment panel 118 because the selected segment has different properties. For example, a segment without a corresponding asset may have camera/view controls, but not visibility controls.

In this way, user interface 150 may be considered a 'story mode', because it makes the abstraction from 'assets, geo content, camera views, . . . ' into a story. A user may interpret user interface 150 to read as a story, such as, "First there is an initial look at, then the news starts, you look then at an unspecified point and advance to the airport . . . ." So, user interface 150 gives a user the semantics of the tour in a quick overview.

Figure 2:
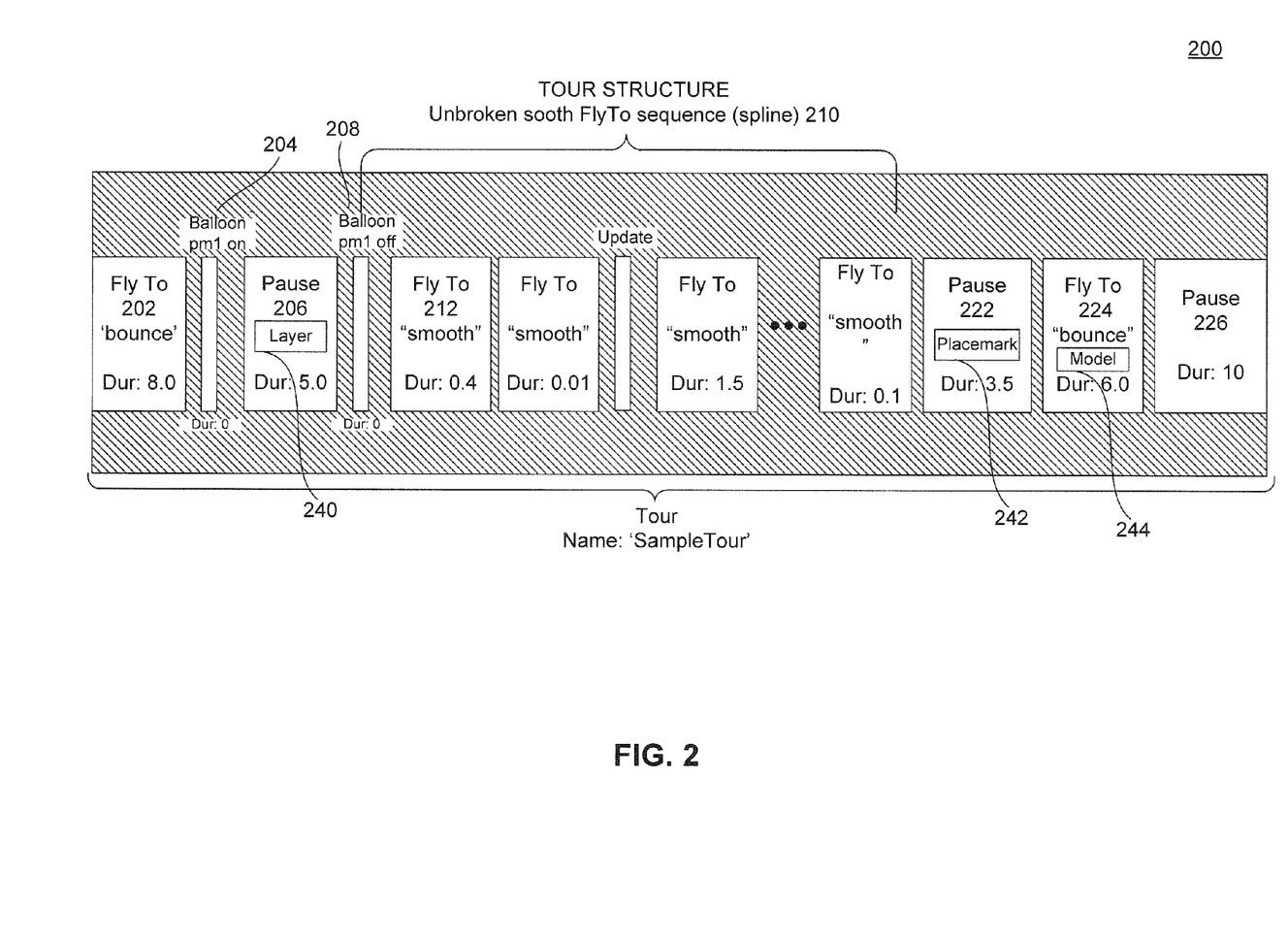
FIG. 2 is a diagram illustrating a series of segments of a tour, according to an embodiment.

FIG. 2 is a diagram 200 illustrating a series of segments of a tour according to an embodiment. As discussed above, each segment includes a duration value. A duration value of a segment defines how much tour time elapses to complete the segment. If the segments are in a sequence, the point in the tour timeline at which the segment occurs may be determined by summing the durations of all the previous segments in the sequence.

One type of segment, which may be referred to herein as a fly-to segment, may cause the virtual camera to move to a new position. The sequence of segments starts with a fly-to segment 202. Fly-to segment 202 instructs the virtual camera to "bounce" to a new position. Bouncing the virtual camera may mean that the virtual camera follows a (perhaps parabolic) trajectory and comes to rest at the new position. The duration of 8 seconds may instruct the GIS to regulate the virtual camera's speed such that the virtual camera comes to rest at its new position in 8 seconds. Other transitions aside from bouncing are available. Other transitions include, for example, zoom-in/-out, ease-in/-out, and a predefined animation path. These transitions may be associated with the segment.

When the virtual camera comes to rest at a new position, a segment 204 instructs the GIS to display an informational balloon. With the informational balloon displayed to a user, a segment 206 instructs the virtual camera to pause at its position for a duration of 5 seconds to afford the user time to view the informational balloon.

Segment 206 includes an asset 240 to display a layer texture mapped to a three-dimensional model in the three dimensional environment. The layer may, for example, designate a region of a three-dimensional model of the Earth. While segment 206 is played layer 240 may be displayed. In an example, layer 240 may not be displayed during the entire time that segment 206 is played. Segment 206 may, for example, designate a time during segment 206 to present layer 240. Segment 206 may specify how to fade layer 240 in or out of the tour. After segment 206, the informational balloon is turned off at segment 208.

Following segment 208 is an unbroken sequence of smooth fly-to segments 210. A smooth fly-to segment may instruct the virtual camera to move to a new position at a constant speed. In contrast to a bounce fly-to action, a smooth fly-to segment does not necessarily instruct the virtual camera to come to rest at its new position. Sequence of smooth fly-to segments 210 instructs the virtual camera to fly continuously through a series of positions (and possibly feature times). The path that the virtual camera flies may be determined using spline interpolation. The duration values may control the speed of the virtual camera moves along the path. For example, a fly-to segment 212 may specify that the virtual camera move at a speed such that it reaches a new position in 0.4 seconds. So, an unbroken sequence of smooth fly-to segments (such as 210) may specify a continuous, interpolated path for a camera at specified speeds. A sequence of smooth fly-to actions may be broken by an action that instructs the virtual camera to stop. For example, a sequence may be broken by a bounce fly-to action (such as fly-to segment 202) or a pause action (such as an segment 222).

Sequence of smooth fly-to actions 210 ends at segment 222. Segment 222 instructs the camera to pause for 3.5 seconds. Segment 222 includes an asset 242 that provides for display of a photo placemark. The photo placemark may show a user photo at a specified position and with a specified orientation in the three dimensional environment. The photo placemark may, for example, appear as a billboard in the three dimensional environment. Just as with segment 206, segment 222 may specify when, during playback of segment 222, to display the photo placemark.

After pausing and displaying the photo placemark, a fly-to segment 224 instructs the camera to bounce to a new position. During segment 224, an asset 224 is displayed. Asset 224 is a three dimensional model at a specified position within the three-dimensional environment. In an example, the three dimensional model may be a three dimensional model of a building.

After display of the three-dimensional model in segment 224, the virtual camera may pause for 10 seconds as instructed by an action 226. This ends the tour specified in diagram 200.

Figure 3:
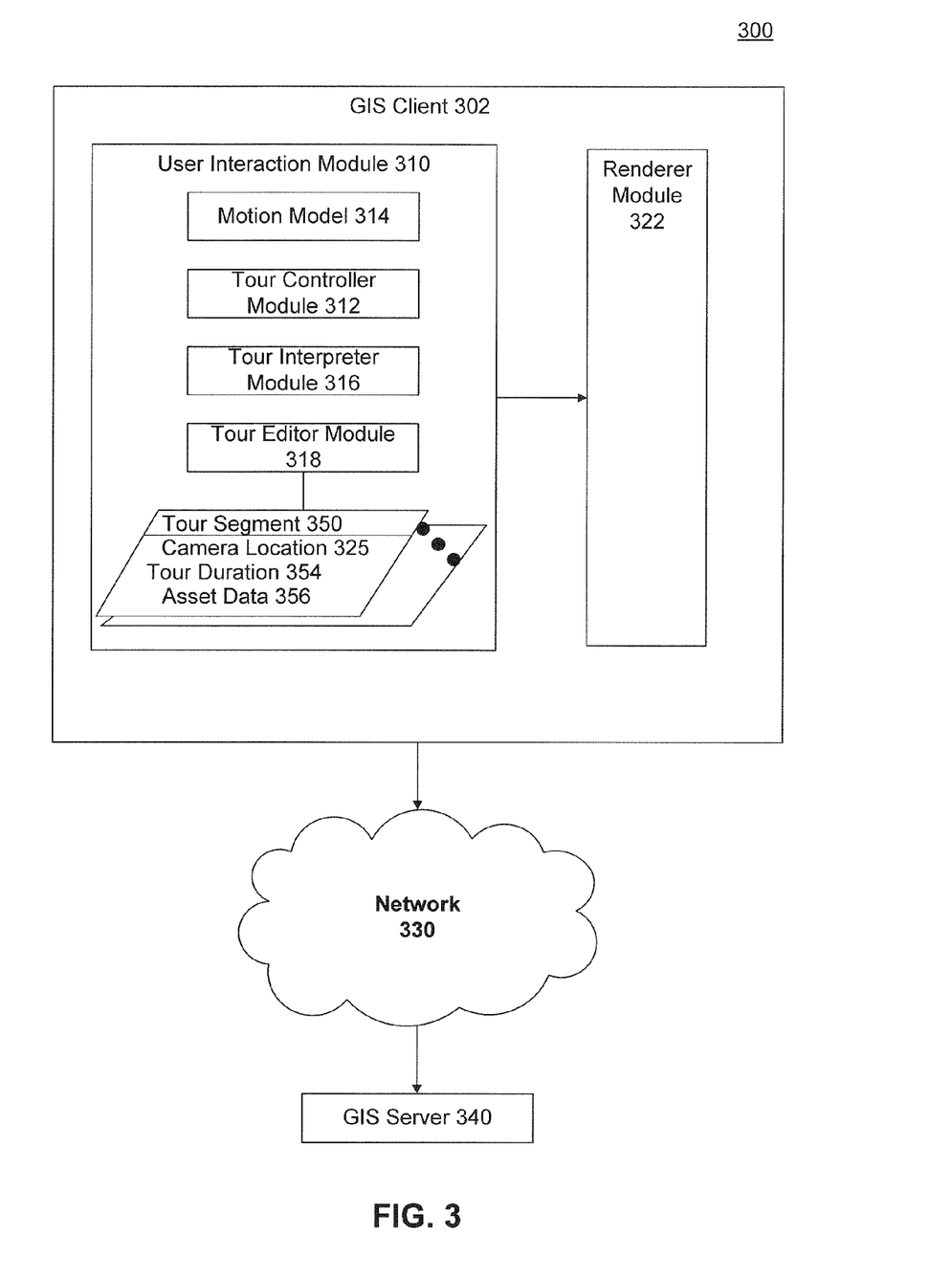
FIG. 3 is a diagram illustrating a system for editing a series of segments of a tour, according to an embodiment.

FIG. 3 is a diagram illustrating a GIS 300 for editing a series of segments tours according to an embodiment. GIS 300 includes a GIS client 302 coupled to a GIS server 340 across one or more network(s) 330, such as the Internet.

GIS client 302 includes a user interaction module 310 and a renderer module 322.

User interaction module 310 includes a motion model 314, a tour controller module 312, a tour interpreter module 316, and a tour editor module 318.

Tour editor module 318 enables a user to define a tour that includes a series of segments and enables a user to alter an order of the series of segments. Tour editor module 318 may provide an interface to display a plurality of segment icons in chronological order. Each segment icon may represent a tour segment 350. The interface may also include a cursor identifying a particular time of a segment of the tour. Finally, the interface may include a viewport displaying the three-dimensional environment from a perspective of a virtual camera at the particular time identified by the cursor. To display the three-dimensional environment from a perspective of a virtual camera, the viewport may utilize tour interpreter module 316, tour controller module 312, motion model 314 and renderer module 322 as described below. An example interface is illustrated in FIGS. 1A-B.

Tour editor module 318 enables a user to define one or more tour segments 350.

Each tour segment 350 may include a camera location 325, a tour duration 354, and asset data 356. Camera location 325 may define a position (and orientation) of a virtual camera in the three-dimensional environment during playback of the segment of the tour. Tour duration 354 defines how long the segment lasts in the tour. Asset data 356 may define an asset to be visible at a specified position in the three-dimensional environment at a time relative to when the segment of the tour is played. Asset data 356 may also define when to present the asset during the segment and how to fade the segment in and out. Each tour segments 350 may, for example, be implemented as a snippet of Keyhole Markup Language (KML). Together, a series of tour segments 350 may define a tour.

As mentioned above, to assist in editing the tour, GIS client 310 may enable playback a tour in a viewport. Tour interpreter module 316 may assist in playback of the tour. Tour interpreter module 316 receives a sequence of actions for a tour. In one embodiment, tour interpreter module 316 may parse a Keyhole Markup Language (KML) file that includes the sequence of segments. In the sequence of segments, each segment may include a position in the geographic information, and a duration in tour time, and asset data.

Once tour interpreter module 316 receives data for a tour, tour controller module 312 plays the tour. To play the tour, tour controller module 312 changes a position (and possibly orientation) of the virtual camera as the tour time elapses. Tour controller module 312 also may display assets associated with each segment.

In general, as tour controller module 312 changes a position (and possibly orientation) of the virtual camera, GIS client 302 operates as follows. Through motion model 314, tour controller module 312 constructs a view specification defining the virtual camera using camera data in each segment. Renderer module 322 uses the view specification to decide what data is to be drawn and draws the data. If renderer module 322 needs to draw data that GIS client 302 does not have, GIS client 302 sends a request to GIS server 340 for the additional data. In this way, GIS client 302 may playback a tour in a viewport, such as viewport 122 in FIGS. 1A-B.

Motion model 314 constructs a view specification. The view specification defines the virtual camera's viewable volume within a three dimensional space, known as a frustum, and the position and orientation of the frustum in the geographic data. In an embodiment, the frustum is in the shape of a truncated pyramid. The frustum has minimum and maximum view distances that can change depending on the viewing circumstances. Thus, changing the view specification changes the geographic data culled to the virtual camera's viewable volume. The culled geographic data is drawn by renderer module 322.

The view specification may specify three main parameter sets for the virtual camera: the camera tripod, the camera lens, and the camera focus capability. The camera tripod parameter set specifies the following: the virtual camera position (X, Y, Z coordinates); which way the virtual camera is oriented relative to a default orientation, such as heading angle (e.g., north?, south?, in-between?); pitch (e.g., level?, down?, up?, in-between?); and yaw/roll (e.g., level?, clockwise?, anti-clockwise?, in-between?). The lens parameter set specifies the following: horizontal field of view (e.g., telephoto?, normal human eye—about 55 degrees?, or wide-angle?); and vertical field of view (e.g., telephoto?, normal human eye—about 55 degrees?, or wide-angle?). The focus parameter set specifies the following: distance to the near-clip plane (e.g., how close to the "lens" can the virtual camera see, where objects closer are not drawn); and distance to the far-clip plane (e.g., how far from the lens can the virtual camera see, where objects further are not drawn). In examples, during each segment of the tour, a user may In addition to motion model 314, user interaction module 310 includes a tour controller module 312, a tour interpreter module 316, and a tour editor module 318.

Each of GIS client 302 and GIS server 340 may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Each of user interaction module 310, renderer module 322, motion model 314, tour controller module 312, tour interpreter module 316, and tour editor module 318 may be implemented in hardware, software, firmware, or any combination thereof.

Figure 4A:
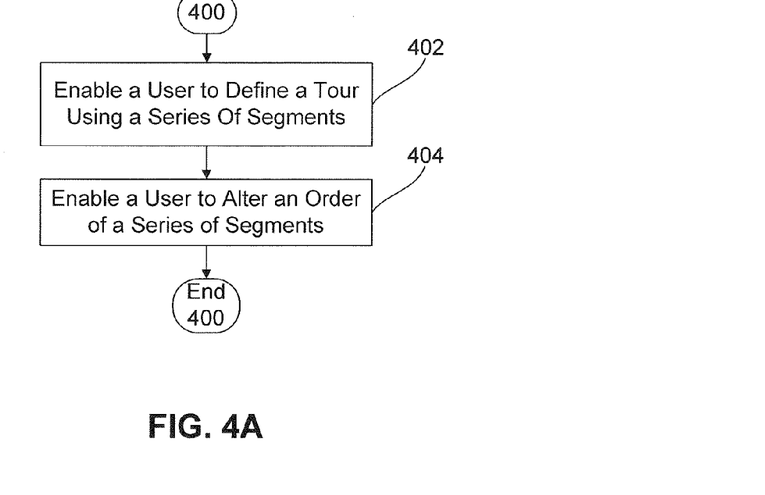
FIG. 4A is a flowchart illustrating a method for editing a series of segments of a tour, according to an embodiment.

FIG. 4A is a flowchart illustrating a method 400 for editing a series of segments of a tour according to an embodiment. Method 400 begins at step 402 by enabling a user to define a tour comprising a series of segments. To enabling the user to define the tour, an interface, such as the interface in FIGS. 1A-B, may be provided. Each segment may specify a duration of the segment in the tour, a position of a virtual camera in the three-dimensional environment during playback of the segment of the tour, and an asset to be visible at a specified position in the three-dimensional environment at a time relative to when the segment of the tour is played. Method 400 also includes a step 402 to enable a user to alter an order of the series of segments. For example, a user may drag-and-drop a segment icon representing a segment to a new position in the tour. In this way, a user can easily change when a camera is displayed together with when an asset is displayed.

Figure 4B:
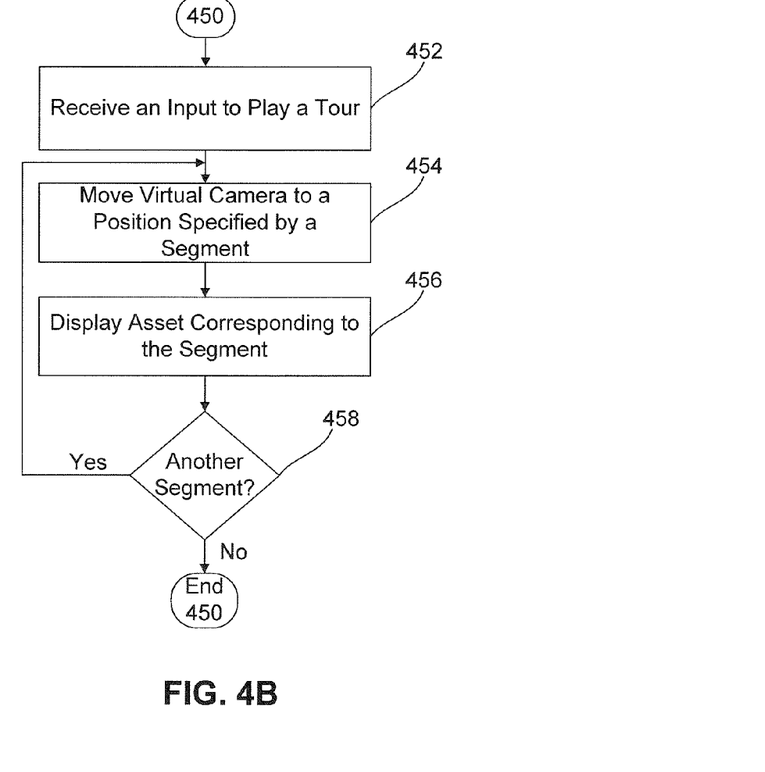
FIG. 4B is a flowchart illustrating a method for playing a series of segments of a tour, according to an embodiment.

FIG. 4B is a flowchart illustrating a method 450 for playing a series of segments of a tour according to an embodiment. Method 450 begins at a step 452 by receiving an input to play a tour. At step 454, a virtual camera is moved to a position specified by a first segment. At step 456, an asset associated with the first segment is displayed. At step 458, steps 454 and 456 are repeated for each segment in the tour. In this way, method 450 plays a tour that includes a series of tour segments.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for efficiently editing a tour, comprising:
   (a) receiving by one or more computing devices, user-defined tour, the user-defined tour comprising a series of segments, each segment specifying:
      (i) a duration of the segment in the user-defined tour,
      (ii) a position of a virtual camera in a three-dimensional environment on a geographic information system during playback of the segment of the user-defined tour, the three-dimensional environment including a three-dimensional model of geographic information and the virtual camera specifying a viewpoint to display the three-dimensional model of geographic information in the three-dimensional environment, and
      (iii) an asset to be displayed at a specified position in the three, dimensional environment during playback of the segment of the user-defined tour;
   (b) a receiving, by the one or more computing devices, alteration to an order of the series of segments;
   (c) receiving, by the one or more computing devices, a request to play the user-defined tour;
   in response to receiving, the request to play the user-defined tour, for each segment of the user-defined tour in an order based at least in part on the received alteration of the order of the series of segments:
   (d) moving, by the one or more computing devices, the virtual camera through the three-dimensional environment to the position specified by the segment to display the three-dimensional environment from the viewpoint of the virtual camera; and
   (e) displaying, by the one or more computing devices the asset in the three-dimensional environment.

2. The method of claim 1, wherein the (a) receiving the user-defined tour comprises providing an interface displaying:
   (i) a plurality of segment icons in chronological order, each segment icon representing a segment in the series of segments;
   (ii) a cursor identifying a particular time of a segment of the user-defined tour; and
   (iii) a viewport displaying the three-dimensional environment from a perspective of a virtual camera at the particular time identified by the cursor.

3. The method of claim 1, wherein a length of each of the plurality of segment icons corresponds to the duration of the segment represented by the segment icon.

4. The method of claim 1, wherein, for at least one segment in the series of segments, the asset has a specified position within a view frustrum of a virtual camera at the position of a virtual camera specified in the segment.

5. The method of claim 1, wherein an asset of at least one segment of the series of segments includes a two-dimensional overlay to be texture mapped on a three-dimensional model in the three dimensional environment.

6. The method of claim 1, wherein an asset of at least one segment of the series of segments includes a three-dimensional model.

7. The method of claim 1, wherein an asset of at least one segment of the series of segments includes a two-dimensional placemark to be displayed at a specified position and orientation in the three dimensional model.

8. The method of claim 1, wherein an asset of at least one segment of the series of segments includes a point of interest to be displayed at a specified position in the three dimensional model.

9. A system for efficiently editing a tour, comprising:
   a tour editor module that defines a user-defined tour through a three-dimensional environment on a geographic information system, the user-defined tour comprising a series of segments and alters an order of the series of segments, each segment of the series specifying:
      (i) a duration of the segment in the user-defined tour,
      (ii) a position of a virtual camera in the three-dimensional environment during playback of the segment of the user-defined tour, the virtual camera specifying a viewpoint to display the three-dimensional model of geographic information in the three-dimensional environment, and
      (iii) an asset to be displayed at a specified position in the three-dimensional environment during playback of the segment of the user-defined tour;
   a tour interpreter module that receives a request to play the user-defined tour and, in response to the request to play the user-defined tour, for each segment of the user-defined tour in an order specified by the series of segments, changes a position in the three-dimensional environment of the virtual camera to the position specified by the segment to display the three-dimensional environment from the viewpoint of the virtual camera; and
   a renderer module that, for each segment of the user-defined tour in an order specified by the series of segments, renders the asset in the three-dimensional environment in response to the input to play the user-defined tour
   wherein the series of segments tour editor module, tour interpreter module, renderer module are, each implemented on at least one computing device.

10. The system of claim 9, wherein the tour editor module provides an interface displaying:
   (i) a plurality of segment icons in chronological order, each segment icon representing a segment in the series of segments;
   (ii) a cursor identifying a particular time of a segment of the user-defined tour; and
   (iii) a viewport displaying the three-dimensional environment from a perspective of a virtual camera at the particular time identified by the cursor.

11. The system of claim 9, wherein a length of each of the plurality of segment icons corresponds to the duration of the segment represented by the segment icon.

12. The system of claim 9, wherein, for at least one segment in the series of segments, the asset has a specified position within a view frustrum of a virtual camera at the position of a virtual camera specified in the segment.

13. The system of claim 9, wherein an asset of at least one segment of the series of segments includes a two-dimensional overlay to be texture mapped on a three-dimensional model in the three dimensional environment.

14. The system of claim 9, wherein an asset of at least one segment of the series of segments includes a two-dimensional overlay to be texture mapped on a three-dimensional model in the three dimensional environment.

15. The system of claim 9, wherein an asset of at least one segment of the series of segments includes a three-dimensional model.

16. The system of claim 9, wherein an asset of at least one segment of the series of segments includes a two-dimensional placemark to be displayed at a specified position and orientation in the three dimensional model.

17. The system of claim 9, wherein an asset of at least one segment of the series of segments includes a point of interest to be displayed at a specified position in the three dimensional model.

18. A non-transitory computer-readable storage medium having instructions stored thereon that, when executed by a computer, cause the computer to perform a method for efficiently editing a tour, the method comprising:
   (a) receiving, by one or more computing devices, a user-defined tour, the user-defined tour comprising a series of segments, each segment specifying:
      (i) a duration of the segment in the user-defined tour,
      (ii) a position of a virtual camera in a three-dimensional environment on a geographic information system during playback of the segment of the user-defined tour, the three-dimensional environment including a three-dimensional model of geographic information and the virtual camera specifying a viewpoint to display the three-dimensional model of geographic information in the three-dimensional environment, and
      (iii) an asset to be displayed at a specified position in the three-dimensional environment during playback of the segment of the user-defined tour;
   (b) receiving, by the one or more computing devices, alteration to an order of the series of segments;
   (c) receiving, by the one or more computing devices, a request to play the user defined tour;
   in response to receiving the request to play the user-defined tour, for each segment of the user-defined tour in an order based at least in part on the received alteration of the order of the series of segments:
   (d) moving, by the one or more computing devices, the virtual camera through the three-dimensional environment to the position specified by the segment to display the three-dimensional environment from the viewpoint of the virtual camera; and
   (e) displaying, by the one or more computing devices, the asset in the three-dimensional environment.

19. The method of claim 18, wherein an asset of at least one segment of the series of segments includes a three-dimensional model.

20. The method of claim 18, wherein, for at least one segment in the series of segments, the asset has a specified position within a view frustrum of a virtual camera at the position of a virtual camera specified in the segment.

* * * * *